July 23, 1957 A. L. KOCH, JR 2,800,645
ELECTRIC CIRCUIT INTEGRITY CHECKING APPARATUS
Filed Jan. 27, 1955
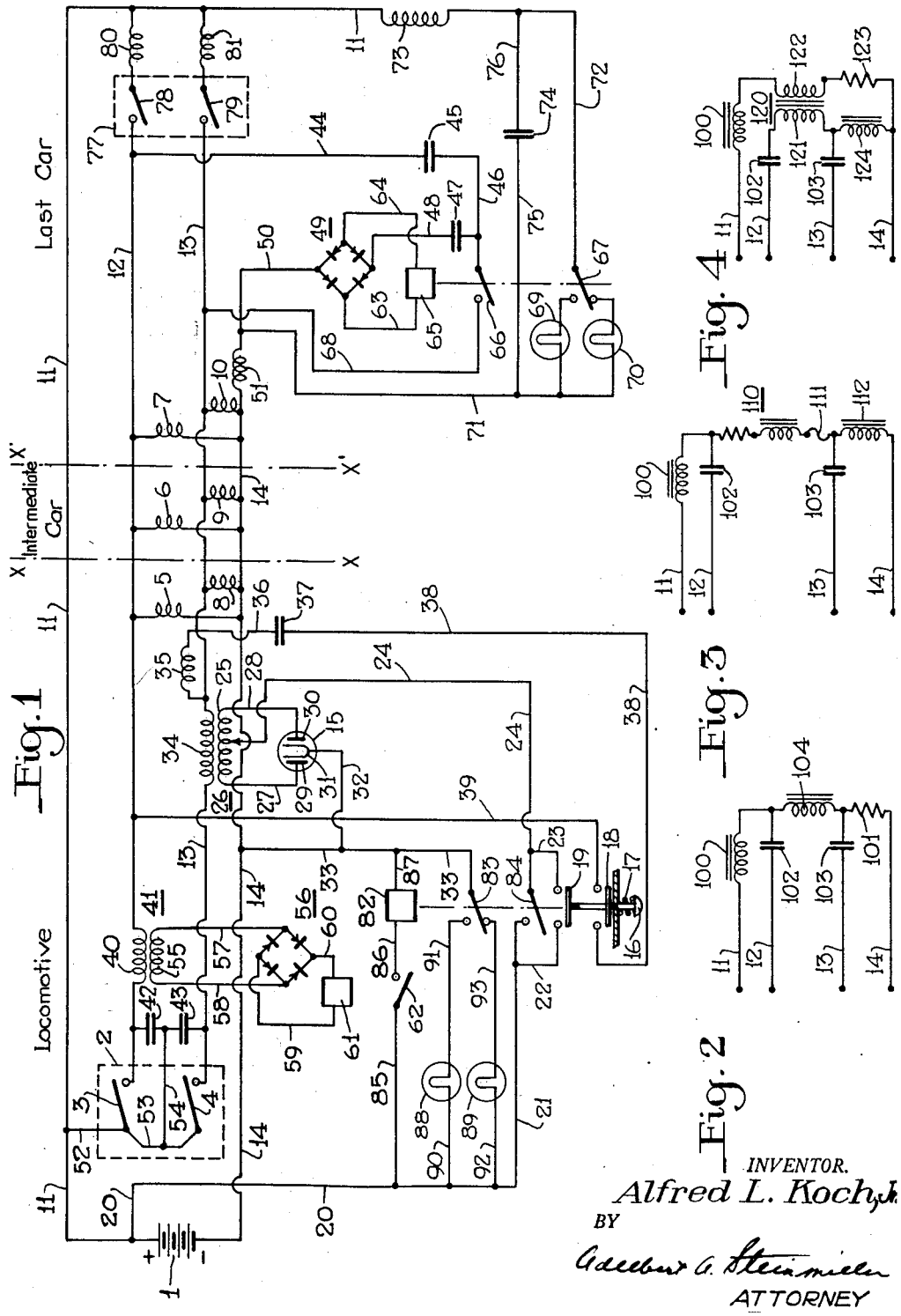
INVENTOR.
Alfred L. Koch, Jr.
BY
ATTORNEY

United States Patent Office 2,800,645
Patented July 23, 1957

2,800,645

ELECTRIC CIRCUIT INTEGRITY CHECKING APPARATUS

Alfred L. Koch, Jr., Pittsburgh, Pa., assignor to Westinghouse Air Brake Company, Wilmerding, Pa., a corporation of Pennsylvania Application January 27, 1955, Serial No. 484,471

6 Claims. (Cl. 340—213)

This invention relates to improvements in electric circuit checking apparatus, and more particularly to improvements in circuit checking apparatus adapted to be associated with electro-pneumatic brake apparatus employed on a train of cars to signal the integrity or lack of integrity of control circuits and other associated electric devices.

This invention is an improvement over similar apparatus disclosed in Patent No. 2,055,563 of A. J. Sorensen et al. and his application, Serial No. 299,632, filed July 18, 1952, now Patent No. 2,736,882, the application being assigned to the assignee of the present application.

The desirability of maintaining a continuous indication of the integrity conditions of the electrical control circuits and associated devices in the electro-pneumatic brake control systems on railroad trains has been apparent for some time, and various means and methods have been proposed and employed for this purpose. However, prior devices have not attained the sensitivity of operation with a lack of complexity as is accomplished in the apparatus which embodies the present invention, as will be more clearly apparent hereinafter.

The apparatus of the present invention attains a sensitive checking operation by use of a high degree of checking voltage to start the apparatus in operation and a means for automatically decreasing the checking voltage when the apparatus is in operation such that any fault will be immediately and positively detected and indicated. Several embodiments of the present invention also provide new and improved rear car apparatus with a minimum of equipment.

It is a primary object of my invention to provide new and improved circuit checking apparatus.

Another object is the provision of a new and improved integrity checking circuit.

Another object is the provision of a new and improved integrity checking circuit of the type in which a checking alternating current may be superimposed in the same conductors on a direct current used for control purposes.

Still a further object of this invention is the provision of a new and improved integrity checking circuit in which the sensitivity of integrity indication is at a maximum with a minimum of equipment.

Yet another object is the provision of a new and improved integrity checking circuit between two locations in which the equipment at one of said locations is at a minimum.

Other objects will become apparent after a study of the accompanying specification when taken in connection with the drawings shown herein in which Fig. 1 is a schematic circuit diagram of one embodiment of the invention, and Figs. 2, 3 and 4 are modifications of a portion of the circuit of Fig. 1.

*Description—Fig. 1*

For the purpose of illustrating the nature and utility of this invention, it is shown in the drawing of Fig. 1 associated with a simplified brake control apparatus including a source of direct current such as a battery 1, and an electro-pneumatic master controller 2 of any convenient and conventional design, such for example that described and claimed in Patent No. 2,068,345 issued January 19,1937 to Donald L. McNeal and assigned to the assignee of this invention. Because a detailed explanation of this controller device may be obtained from this mentioned patent if so desired, it is shown in Fig. 1 in simplified form merely as a switch 2 having two contact arms, a release contact arm 3 and an application contact arm 4.

Whereas the train may comprise any number of cars, for simplicity in illustrating the invention, a two-car train is shown, and the brake control apparatus includes the release magnet valves for the locomotive, intermediate car, and last car, which valves are designated by the reference numerals 5, 6 and 7, respectively, and the application magnet valves designated by the reference numerals 8, 9 and 10, respectively. It should be understood that all other intermediate cars on a train would be similarly equipped, but the showing thereof is not essential to an understanding of the invention. In Fig. 1, the locomotive and last car of the train are shown separated from the intermediate car by lines x—x and x'—x'.

The brake control apparatus also includes a battery supply wire 11, a release control wire 12, an application control wire 13, and a return wire 14, all of which extend from the locomotive throughout the train to the last car, contacts 3 and 4 of the aforementioned electro-pneumatic master controller 2 controlling the application of current to wires 12 and 13 respectively.

As will be explained in more detail herein, the control circuit integrity checking is accomplished by generating at the locomotive an alternating current of suitable frequency, such for example, as 4000 cycles per second, and transmitting this alternating current signal throughout the train control circuits to the last car and then back to the locomotive. The checking function accomplished by the presence of the alternating current signal in the brake control circuits is not influenced by the energization or deenergization of the same control circuits with a direct current control voltage to effect train brake control. Therefore, both alternating current checking voltage and direct current control voltage may be impressed on the same circuit simultaneously. Signal light means are provided to effect indication of integrity. These signal lights are controlled by relays energized by a direct current obtained at the locomotive and last car by rectifying a portion of the alternating current employed for circuit checking purposes. In order to obtain maximum sensitivity of operation of the aforementioned relays, a means is provided on the locomotive whereby the alternating current signal transmitted through the train is of a sufficient degree such that the portion rectified is of an amount to insure pick-up of said relays, but once the said relays have been picked up, the voltage of the alternating current signal is automatically reduced to a degree such that the portion of voltage rectified is of sufficient amount to merely maintain the relays picked-up as long as no fault occurs throughout the train control circuits.

To accomplish this desired objective, an alternating-current generator, shown herein as an oscillator tube 15, is provided on the locomotive. The tube 15 is adapted to be energized by battery 1 when a normally open manually operated reset switch 16 is depressed to closed position against a biasing spring 17. The reset switch 16 has two contact arms 18 and 19, the latter of which completes the circuit for energizing the tube 15 from the battery 1 by way of supply wire 11, wire 20, wire 21, wire 22, contact arm 19 of switch 16, wire 23, wire 24 to the primary winding 25 of a transformer 26 which is connected to the output of the tube 15, alternating first by one half-portion of the primary winding 25 and wire 27 and then by the other half-portion of primary winding 25 and wire 28, to the plates 29 and 30 of said tube, thence to the cathode 31 of said tube, wire 32, wire 33, and return wire 14 to the battery 1.

The output of the tube 15 as previously mentioned is applied to the primary winding 25 of the transformer 26 which has a secondary winding 34 connected in series with the application wire 13. One end of secondary winding 34 is connected to the application contact arm 4 of switch 2, the other end of secondary winding 34 is connected to the application control wire 13 such that the induced voltage in said secondary winding 34 is impressed on the application control wire and as will be explained hereinafter, also is impressed on the release control wire 12. A booster winding 35 is connected between the application control wire 13 and the release control wire 12 in a manner such that when the reset switch 16 is depressed, there is a voltage induced in said booster winding 35 from the primary 25 of transformer 26, said induced voltage of winding 35 being impressed on the application and release control wires 13 and 12 to boost the voltage already impressed thereon by the secondary winding 34. The circuit for the booster winding can be traced from the application control wire 13 at one end of the secondary winding 34 of transformer 26, winding 35, wire 36, condenser 37, wire 38, contact arm 18 of switch 16 and wire 39 to the release control wire 12. The condenser 37 is placed in this circuit to prevent direct current from shunting between the application control wire 13 and the release control wire 12 through the winding 35 when contact arm 18 is closed during a brake application.

The alternating current signal is transmitted by an initial signal circuit when the reset switch 16 is depressed to start the equipment in operation, and by an operating signal circuit when the relays (to be described hereinafter) are picked up.

The initial signal circuit for the alternating current signal can be traced from the secondary winding 34, booster winding 35, wire 36, condenser 37, wire 38, contact arm 18 of switch 16, and wire 39 to the release control wire 12 where the initial signal circuit is divided into two parallel branch circuits. One branch of the initial signal circuit leading to the primary winding 40 of a transformer 41, condensers 42 and 43, and application wire 13 back to the secondary winding 34 of transformer 26. The second branch of the initial signal circuit leads from the release wire 12 to the rear of the train to wire 44, condenser 45, wire 46, condenser 47, wire 48, through the rectifier 49, wire 50, saturating choke coil 51, return wire 14, battery 1, supply wire 11, wire 52, jumper wire 53, wire 54, condenser 43 and application wire 13 back to the secondary winding 34 of transformer 26. The condensers 42 and 43 are for the purpose of arc suppression and for preventing a direct current shunt between the release control wire 12 and the application control wire 13 during a brake application.

In the mentioned one branch of the initial signal circuit the voltage supplied to primary winding 40 of transformer 41 induces a corresponding voltage in its secondary winding 55. The induced voltage in secondary winding is supplied to a rectifier 56 by wires 57 and 58, where it is rectified and supplied by way of wires 59 and 60 to energize and pick up a relay 61 having a front contact 62.

In the mentioned second branch of the initial signal circuit, the portion of the voltage supplied to the rectifier 49 is rectified and supplied by way of wires 63 and 64 to energize and pick up a relay 65 having a front contact 66 and a front and back contact 67. Closing of the contact 66 completes the operating signal circuit as will be explained hereinafter.

After the initial signal circuit has been energized by depressing the reset switch 16, the relay 61 has been energized and picked up, and the relay 65 has been energized and picked up to complete the operating signal circuit, the reset switch may be released and opened thereby opening the initial signal circuit and disconnecting the booster winding 35, leaving only the operating signal circuit to maintain the relays 61 and 65 energized and picked up.

The operating signal circuit may be traced from the secondary winding 34 of transformer 26 by way of application wire 13 to the rear of the train to wire 68, and contact 66 of relay 65 which has been closed by the energizing of the initial signal circuit, to wire 46 where the operating signal circuit is divided into two parallel branch circuits. One branch of the operating signal circuit leading from wire 46 on the rear car to condenser 47, wire 48 to rectifier 49 where a portion of the voltage supplied thereto is rectified and supplied to relay 65 to maintain said relay energized and picked up, thence from rectifier 49 to wire 50, saturating choke coil 51, return wire 14 to battery 1, supply wire 11, wire 52, jumper wire 53, wire 54, condenser 43 and application wire 13 back to the secondary winding 34. The second branch of the operating signal circuit leads from wire 46 to condenser 45, wire 44, release wire 12, and primary winding 40 of transformer 41, causing an induced voltage in its secondary winding 55 which is rectified and supplied to relay 61 to maintain said relay energized and picked up, thence from the secondary winding 40 of transformer 41 to the condensers 42 and 43, and application wire 13 back to the secondary winding 34 of transformer 26.

Included in the rear end equipment are two signal lamps, a white "clear" lamp 69, and a red "fault" lamp 70, which are illuminated selectively according to the energized condition of relay 65. These lamps are connected between the return wire 14 and the supply wire 11 by way of wires 71 and 72. An impedance coil 73 is in series with the lamps 69 and 70 and the supply wire 11 to prevent the alternating current signal from entering the supply wire and to prevent the lamps 69 and 70 from harm that may be caused by inductive surge of the magnet valves 5, 6, 7, 8, 9 and 10. A condenser 74 is also connected in parallel with the lamps 69 and 70 by way of wires 75 and 76 for the purpose of protecting said lamps from the inductive surge of the magnet valves 5, 6, 7, 8, 9 and 10.

On the rear car is a back-up switch 77 shown herein as casing containing two switch arms, a release switch arm 78, and an application switch 79, said switch being for the purpose of controlling application of the brakes of the train from the rear car.

As in previous circuit checking apparatus of this type, an impedance coil is necessary between the battery 1 and the back-up switch 77 to prevent the alternating current signal from interfering with the operation of the back-up switch 77 and prevent said signal from entering the battery supply wire 11 via contact members 78 and 79 when closed. In prior apparatus this was done by placing a large impedance coil in series with the supply wire at the front end of the train. However, to effectively choke the alternating current signal and still meet the low direct current resistance necessitated in normal supply wire circuits required such a large size impedance coil as to be impractical. Also, in prior apparatus with a large impedance coil in the supply wire on the locomotive it was often found that the impedance coil would series resonate with leakage capacitance of the train circuits thus supplying a path back to the oscillator of said apparatus. In this event, a break in the front end of the battery return wire would possibly go undetected. To alleviate this condition in the present apparatus there are two small impedance coils 80 and 81 placed in series with the switch arms 78 and 79 of the back-up switch 77 at the rear of the train, thus not only providing a practical choke for the alternating current signal, but also placing an impedance between the application control wire 12 and the release control wire 13 thereby preventing a short circuit between the said wires 12 and 13 when the switch arms 78 and 79 are closed. Such a short circuit would not be harmful to brake control but would cause a fault indication to be present in the checking apparatus.

Two blocking condensers 45 and 47 are included in the alternating current signal circuits on the rear car to prevent direct current of the braking circuits from reaching the rectifier 49.

Included in the locomotive or front end equipment is a repeater relay 82 having a front and back contact arm 83 and a front contact arm 84, said contact arm 84 being connected in parallel with arm 19 of reset switch 16. Energization of repeater relay 82 is effected by closing of contact arm 62 of relay 61 which completes a circuit from the battery 1 by way of wire 20, wire 85, contact arm 62, wire 86, winding of relay 82, wire 87, wire 33 and return wire 14 to the battery 1.

Also included in the locomotive equipment is a white "clear" lamp 88 and a red "fault" lamp 89 which are illuminated selectively in response to positioning of contact arm 83 of relay 82. The circuits for illuminating the lamps 88 and 89 can be traced from the battery 1 by way of wire 20 to wire 90, lamp 88, wire 91, contact arm 83 in its front closed position, wire 33 and return wire 14; and wire 20 to wire 92, lamp 89, wire 93, contact arm 83 in its back closed position and wire 33 to return wire 14.

*Operation—Fig. 1*

With the circuit checking apparatus conditioned for operation and with no faults existing in the brake control circuits, the checking apparatus is started in operation by depressing the reset switch 16 to close the contact arms 18 and 19. Closing the contact arm 19 completes the circuit described for starting the oscillator tube 15 in operation to induce voltage in the secondary winding 34 of transformer 26 and booster winding 35. Closing the contact arm 18 of the reset switch 16 completes the previously described initial signal circuit throughout the train circuits which in turn effects energization and picking-up of the relay 61 and repeater relay 82 on the locomotive, and relay 65 on the rear car.

The energization and pick-up of relay 82 effects illumination of the "clear" lamp 88 by closure of contact arm 83 in its front closed position, and also closes contact arm 84 to parallel the contact arm 19 of reset switch 16. The energization and pick-up of relay 65 effects illumination of "clear" lamp 69 by closure of contact arm 67 in its front closed position, and also closes contact arm 66 to complete the previously described operating signal circuits.

With both the "clear" lamps 69 and 88 illuminated, the reset switch 16 may be released thereby opening contact arms 18 and 19 by reason of the biasing spring 17. The opening of contact arm 18 renders the booster winding 35 ineffective by opening the initial signal circuit. The opening of contact arm 19 at this time will have no effect on the oscillator circuits due to the fact that contact arm 84 of relay 82 has been closed to parallel contact arm 19 and maintain the energizing circuit of the oscillator tube 15.

The operating signal circuits, made effective by closure of contact arm 66 of relay 65 and opening of the initial signal circuit, are now the only checking circuits in operation, and though of lower voltage than that of the initial circuit (due to ineffectiveness of the booster winding 35), are still sufficient to maintain the relays 61 and 65 picked-up.

If a fault occurs in either the battery supply wire 11 or the return wire 14 throughout the train, it would be indicated as such by opening the energizing circuits and extinguishing both the "clear" lamp 69 and the "fault" lamp 70 on the rear car, and extinguishing all the lamps 69, 70, 88 and 89 if such a fault occurred on the locomotive.

Under actual operating tests of previous apparatus similar to the present invention, it has been found that the distributed capacity from each train wire to ground has been relatively large, especially when there is moisture present in or near the train wires. This leakage capacity is even more predominate in the battery supply and return wires due to the smaller resistance of these wires. In view of this condition, it has been found that if a fault occurs in the battery return wire near the locomotive, such fault is sometimes not indicated due to the leakage capacitance of the return wire and the coils of the magnet valves completing the alternating current signal circuit back to the oscillator transformer secondary winding 34. In the apparatus shown herein, this false indication of "no fault" when a fault does exist is made impossible by the use of a saturating choke coil 51.

The saturating choke coil 51 has a high unsaturated impedance but when saturated by direct current has a low impedance. Using this characteristic of the coil 51, said coil is placed at the rear of the battery return wire 14 where the direct current supplied to the lamps 69 and 70 is in series with the coil 51 to keep said coil saturated with direct current. If a fault occurs in the front end of the battery return wire 14, the leakage capacitance of said wire will be unable to maintain the signal circuit complete by reason that the coil 51 will become unsaturated and provide a very high impedance choke in series with the alternating current signal, thus stopping flow of said alternating current signal to the rectifier 49 to effect indication of said fault as previously described.

If no back-up switch 77 is required, there will be no operator at the rear of the train and therefore there will be no reason for integrity indicating signals at the rear end. In this case, Fig. 1 can be operated just as before by substituting a resistor (not shown) for the signal lamps and removing the lamps and the back-up switch.

If a fault occurs in the release control wire 12 the voltage supplied to the primary 40 of transformer 41 will be reduced if the fault is a short circuit, and completely stopped if the fault is an open circuit. In either case the sensitivity of the relay 61 is such that the relay 61 will drop out to open the contact arm 62 of said relay and effect drop-out of the relay 82. With relay 82 dropped out, the contact arm 83 moves to its back closed position to thus disconnect the illuminating circuit for the "clear" lamp 88 and connect the illuminating circuit for the "fault" lamp 89. Also with relay 82 dropped-out, the contact arm 84 will open to open the circuit to the oscillator tube 15 thereby stopping the source of the alternating current operating signal to the train circuits to effect drop-out of the relay 65 which in turn extinguishes "clear" lamp 69 and illuminates the "fault" lamp 70 by way of the contact arm 67 of said relay. It can thus be seen that either a short circuit or an open circuit occurring in the release control wire 12 is indicated by illuminating the "fault" lamps 89 and 70.

If a fault occurs in the application control wire 13, the alternating current signal will be stopped if the fault is a break or reduced if the fault is a short, such that the signal will be of an amount insufficient to maintain relay 65 pick-up, thereby effecting drop-out of contact arm 66 to open the circuit to the primary winding 40 of transformer 41 thus causing drop-out of relay 61. With both relays 61 and 65 dropped-out, the "fault" lamps 89 and 70 will be illuminated to indicate the presence of the fault.

It can thus be seen that a fault such as a short or a break in any of the train circuits is indicated by appropriate signals.

*Description—Fig. 2*

Figs. 2, 3 and 4 are modifications of the rear unit of Fig. 1 where no back-up switch is required and therefore no rear unit integrity indication signal is necessary.

In Fig. 2, the rear end equipment shown operates with the locomotive equipment shown in Fig. 1. The coil 100 chokes the alternating current signal and prevents it from entering the battery supply wire 11 in a manner similar to the coil 73 of Fig. 1. The resistor 101 limits the direct current and chokes the alternating current signal thus preventing same from entering the battery return wire 14. The condensers 102 and 103 prevent direct current from entering the release control wire 12 and the application control wire 13 at the rear end of the train. A saturating coil 104 having a high alternating current impedance except when saturated by direct current, is located in series with the resistor 101 to be saturated by the direct current therein. A fault in either the application or release control wires 13 and 12 will operate the indicating signals on the locomotive as described in the operation of the equipment of Fig. 1. A fault in either the battery supply wire 11 or the battery return wire 14 will remove the direct current from the saturating coil 104 to unsaturate same and thus provide a high alternating current signal impedance in series with the locomotive equipment shown in Fig. 1 and thereby cause the locomotive equipment to operate as described in the operation of the equipment of Fig. 1 to illuminate the fault lamp 89.

Description—Fig. 3

Fig. 3 is a modification of the rear end equipment similar to that of Fig. 2 with the exception that the direct current limiting resistor 101 of Fig. 2 is wound on the saturating coil as is shown in Fig. 3 and the combined formed designated as 110. A fuse 111 is added in series with the combined resistor and coil 110 and placed between the release wire 12 and application wire 13. This modification makes the combined resistor and coil 110 self checking in the event of its shorting out. Thus, if wire turns of the saturating coil are shorted out, the wire turns of the resistor will likewise be shorted out to raise the direct current in the circuit and cause the fuse 111 to burn out, thereby opening the alternating current signal circuit to effect a fault indication as described previously. A coil 112 is placed in series with the battery return wire 14 to provide a load for the alternating current signal in the said wire. All other faults of the type mentioned herein are indicated as described in Figs. 1 and 2.

Description—Fig. 4

In Figs. 2 and 3 it will be noticed that in the rare instance that the condenser 103 or both condensers 102 and 103 should become shorted, undesired brake application may be effected.

Fig. 4 is another modification of the rear end equipment shown in Fig. 2 wherein the battery supply wire 11 is isolated from the release and application wires 12 and 13 by use of a saturating transformer 120 having a primary winding 121 and a saturable secondary winding 122. With this arrangement, a short in the condensers 102 and 103 cannot effect an undesired brake application. A resistor 123 is placed in series with the saturable secondary winding 122 to limit the direct current and choke the alternating current signal. A coil 124 is connected between the application wire 13 and the return wire 14 to provide a load for the alternating current signal. The condensers 102 and 103 of Figs. 2 and 3 are still necessary in Fig. 4 to prevent direct current from entering the primary winding 120 and prevent a direct current short between the application and release wires 13 and 12 during a brake application.

With direct current flowing through the saturable secondary winding 122 to saturate said winding, the impedance of said winding is of such a low value as to cause the alternating current voltage drop across the primary winding 121 to be small and the alternating current signal to be high, thus providing a normal checking signal as described previously. However, if a fault should occur in either the supply wire 11 or the return wire 14, the direct current to the secondary winding 122 is stopped thereby unsaturating said winding to effect placing of a very high impedance secondary winding 122 on the transformer 120. With a high impedance secondary on the transformer 120 the alternating current voltage drop across the primary winding 121 is very large and the alternating current signal will be reduced to a value low enough to effect drop-out of the relays and indicating equipment on the locomotive as shown and described in connection with Fig. 1, thus indicating said fault in the two mentioned wires 11 and 14. All other train wire faults are indicated as described previously in the description of Figs. 1, 2 and 3.

Although I have shown but one complete apparatus and several modifications of the rear car equipment it should be understood that various changes, modifications and combinations of modifications may be made therein without departing from the spirit of the invention.

Having now described the invention, what I claim as new and desire to secure by Letters Patent, is:

1. Apparatus for detecting a fault condition in an electrical circuit, said apparatus comprising an alternating current generator, transformer means including a primary winding, a secondary winding, and a secondary booster winding, for providing an initial connection, including all of said transformer windings, between said generator and said circuit whereby said generator supplies to said circuit alternating current exceeding a certain value at one time and at another time for providing a second connection, including only said primary winding and said secondary winding of said transformer means, between said generator and said circuit whereby said generator supplies a lesser alternating current thereto, means for controlling said transformer means to provide said initial connection and thereafter to provide said second connection, relay means picked up only by an alternating current exceeding said certain value and maintained picked-up by said lesser alternating current, said relay means being effective to maintain said second connection intact as long as the integrity of said circuit is unimpaired.

2. Apparatus for detecting a fault condition in an electrical circuit, said apparatus comprising oscillator tube means to produce a high frequency alternating current, transformer means including a primary winding, a secondary winding and a secondary booster winding for providing an initial connection, including all of said transformer windings, between said oscillator tube means and said circuit whereby said oscillator tube means supplies to said circuit alternating current exceeding a certain value at one time and at another time providing a second connection, including only said primary winding and said secondary winding of said transformer means, between said oscillator tube means and said circuit whereby said oscillator tube means supplies a lesser alternating current thereto, means for controlling said transformer means to provide said initial connection and thereafter to provide said second connection and relay means picked up only in response to an alternating current exceeding said certain value and maintained picked-up by said lesser alternating current, said relay means being effective to maintain said second connection intact only as long as the integrity of said circuit is unimpaired.

3. Apparatus for detecting a fault condition in an electrical control system which includes a plurality of control wires extending between two stations, said apparatus comprising an alternating current generator, means for establishing an initial connection between said generator and said control wires whereby said generator supplies to said control wires alternating current exceeding a certain value and then subsequently establishing a second connection between said generator and said control wires whereby said generator supplies a lesser alternating current thereto, first current-responsive relay means at one of said stations adapted to be actuated from a dropped-out to a picked-up position only in response to flow of alternating current in said control wires while said initial connection endures and to be maintained in its picked-up position responsively to the alternating current flow in the control wires while the said second connection exists, second current-responsive relay means at the other of said stations adapted to be actuated from a dropped-out to a picked-up position only in response to flow of alternating current in said control wires while said initial connection endures and to be maintained in its picked-up position responsively to the alternating current flowing in the control wires while the said second connection exists, signal means operably controlled by said first current-responsive relay means to effect indication of the integrity condition of said control wires, and additional signal means operably controlled by said second current-responsive relay means to effect an additional indication of the integrity condition of said control wires.

4. Apparatus for detecting a fault condition in an electrical control system which includes a plurality of control wires extending between two stations, said apparatus comprising an alternating current generator, means for establishing an initial connection between said generator and said control wires whereby said generator supplies to said control wires alternating current exceeding a certain value and then subsequently establishing a second connection between said generator and said control wires whereby said generator supplies a lesser alternating current thereto, first current-responsive relay means at one of said stations adapted to be actuated from a dropped-out to a picked-up position only in response to flow of alternating current in said control wires while said initial connection endures and to be maintained in its picked-up position responsively to the alternating current flowing in the control wires while the said second connection exists and the integrity of the control wires is unimpaired, second current-responsive relay means at the other of said stations adapted to be actuated from a dropped-out to a picked-up position only in response to flow of alternating current in said control wires while said initial connection endures and to be maintained in its picked-up position responsively to the alternating current flowing in the control wires while the said second connection exists and the integrity of the control wires is unimpaired, signal means operably controlled by said first current-responsive relay means to effect indication of the integrity condition of said control wires, and additional signal means operably controlled by said second current-responsive relay means to effect an additional indication of the integrity condition of said control wires.

5. Apparatus for detecting a fault condition in an electrical control system, said apparatus comprising an alternating current generator, means for establishing an intitial connection between said generator and said circuit whereby said generator supplies to said circuit alternating current exceeding a certain value and then subsequently establishing a second connection between said generator and said circuit whereby said generator supplies a lesser alternating current thereto, current-responsive relay means adapted to be actuated from a dropped-out to a picked-up position only in response to flow of alternating current in said circuit occurring while said initial connection endures and the integrity of said circuit is unimpaired and to be maintained in its picked-up position responsively to the alternating current flowing in the circuit while said second connection exists and the integrity of said circuit is unimpaired, saturating coil means operably connected to said current-responsive relay means and adapted to effect return of said current-responsive relay means from a picked-up position to a dropped-out position when the integrity condition of said control wires is impaired, and signal means controlled by said relay means.

6. Apparatus for detecting a fault condition in an electrical control system which includes a plurality of control wires extending between two stations and a source of direct current adapted for energizing connection with said control wires, said apparatus comprising an alternating current generator, means for establishing an initial connection between said generator and said control wires whereby said generator supplies to said control wires alternating current exceeding a certain value and then subsequently establishing a second connection between said generator and said control wires whereby said generator supplies a lesser alternating current thereto, first current-responsive relay means at one of said stations adapted to be actuated from a dropped-out to a picked-up position only in response to flow of alternating current in said control wires while said initial connection endures and to be maintained in its picked-up position responsively to the alternating current flow in the control wires while the said second connection exists and the integrity condition of said control wires is unimpaired, second current-responsive relay means at the other of said stations adapted to be actuated from a dropped-out to a picked-up position only in response to flow of alternating current in said control wires while said initial connection endures and to be maintained in its picked-up position responsive to the alternating current flowing in the control wires while the said second connection exists and the integrity condition of said control wires is unimpaired, saturating reactor means at one of said stations saturated by direct current flow through said control wires from said source of direct current to provide a low impedance to said alternating current flow when the integrity of said control wires is unimpaired and provide a high impedance to said alternating current flow when not saturated by said direct current when the integrity of said control wires is impaired, and signal means operably controlled by said first and second current-responsive relay means to effect indication of the integrity condition of said control system.

References Cited in the file of this patent

UNITED STATES PATENTS

| 1,081,278 | Bitting | Dec. 9, 1913 |
| 1,246,687 | Wells | Nov. 13, 1917 |
| 2,082,143 | Bossart | June 1, 1937 |